United States Patent Office 3,395,681
Patented Aug. 6, 1968

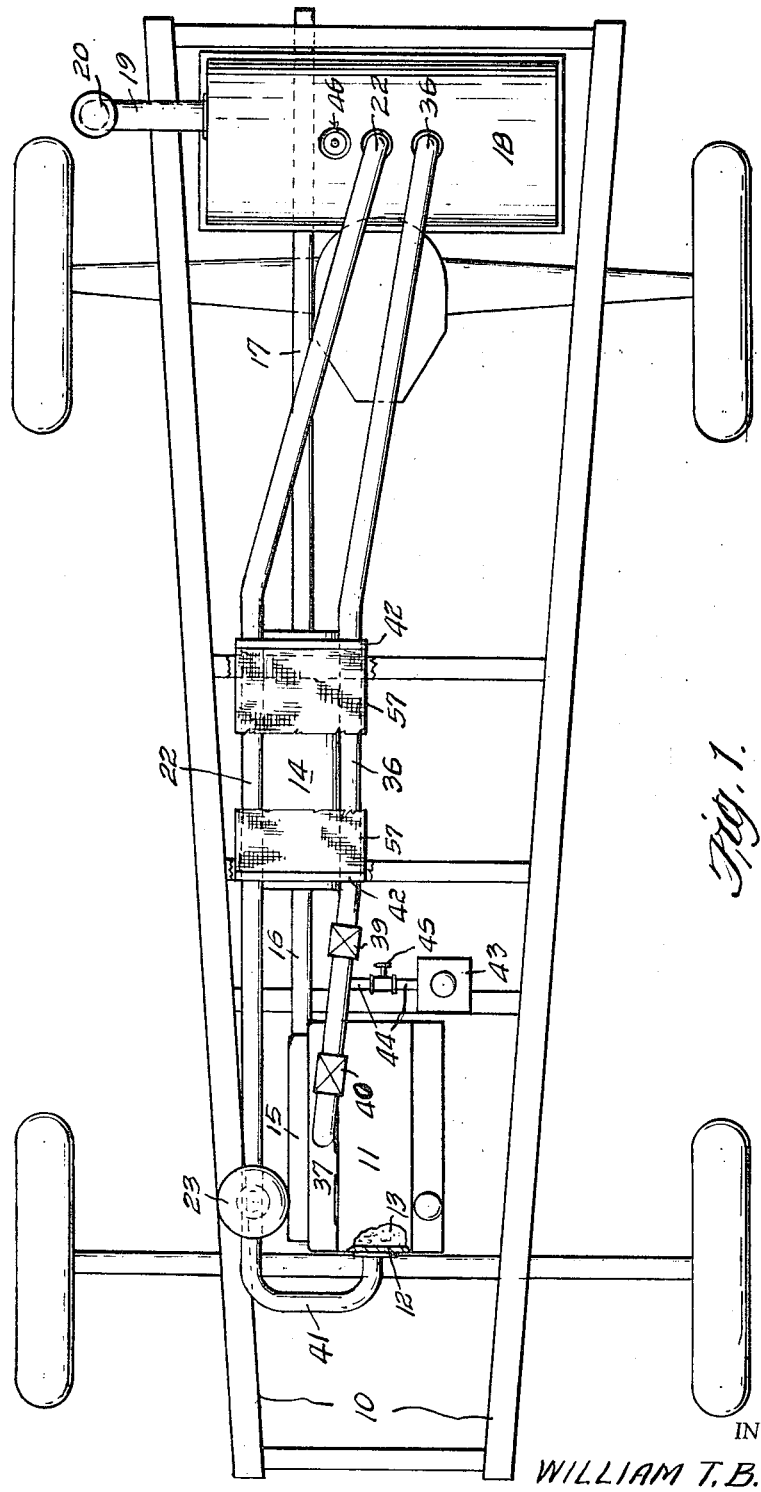

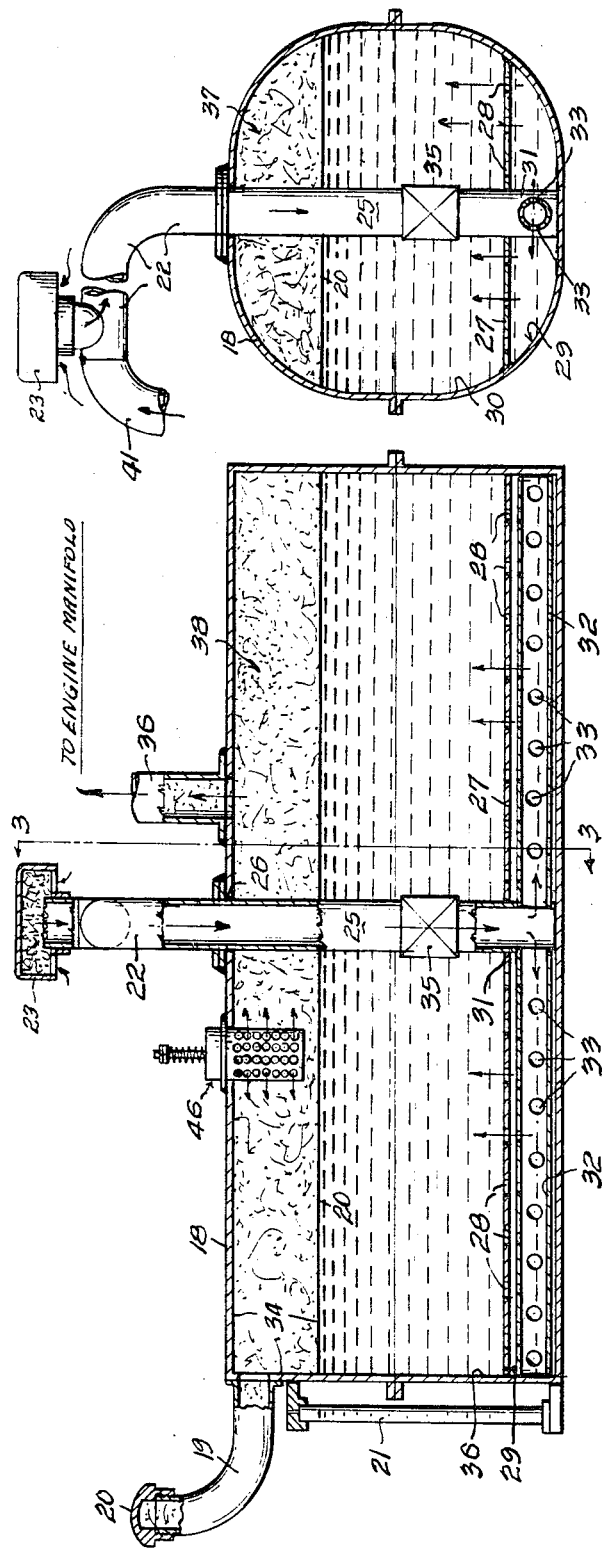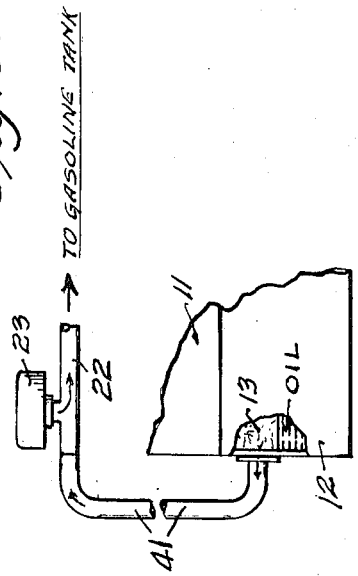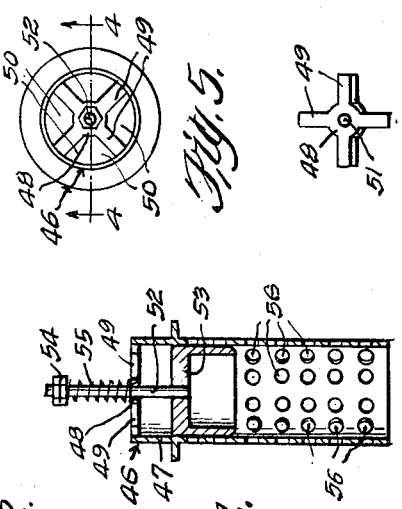

3,395,681
FUEL EVAPORATOR AND ECONOMIZER FOR INTERNAL COMBUSTION ENGINES
William T. B. Walker, 2697 Cunard St., Los Angeles, Calif. 91106
Filed Oct. 12, 1965, Ser. No. 495,035
5 Claims. (Cl. 123—119)

ABSTRACT OF THE DISCLOSURE

A fuel-supply system for an internal-combustion engine is disclosed. The liquid fuel is contained in a tank, incorporating a baffle for dispursing vaporized waste fuel that is drawn from the engine crank case to be returned to the fuel intake of the engine. A heat exchanger supplies heat to the waste-fuel duct as well as the intake fuel duct and a demand valve is incorporated to supply a metered quantity of air to the fresh fuel that is drawn from the tank. An auxiliary fuel source is also disclosed, along with certain safety and control valves.

---

This invention relates to new and used improvements in fuel evaporators and economizers for internal combustion engines for automobiles, trucks, tractors and boats that will be simple to manufacture and install, which will eliminate the use of the conventional types of carburetors and fuel pump, and which will also eliminate vapor lock in the hottest of weather.

Accordingly, it is a primary object of the invention to provide a new and improved inexpensive gaseous fuel supply to generate and deliver inflammable fuel directly from the gasoline tank to the intake manifold of the engine.

Another object of the invention is to utilize all of the gaseous fuel, none wasted, that escapes from the combustion chambers in the engine cylinders caused by the upstrokes of the engine pistons forcing gaseous fuel downwardly between the piston-rings and the inner walls of the engine cylinders into the crank-case, which fuel dilutes and contaminates the crankcase oil, thinning it out for one thing and thereby wasting it as far as lubricating quality is concerned.

Another object of the invention is the charging of the wasted crank-case gases with filtered fresh air while conducting same to a special gaseous fuel supply chamber in the gasoline tank, first conducting it to the bottom of the gasoline in the gasoline tank from where it trinkles upwardly through the gasoline in the gasoline tank to become fully saturated with gasoline before entering the fuel supply chamber where it is finally with auxiliary fresh air at atmospheric temperature, and from which special gaseous fuel supply chamber the thoroughly mixed and chemically balanced fuel is conducted, by suction from the pistons in the engine cylinders, to the intake manifold of the engine.

A still further object of the invention is to overcome certain practical objections to, and defects in, the present known crank-case, other similarly known anti-smog control devices for motor vehicle and motor boats.

The above and other objects and advantages of the invention will appear upon reading the following specification and claims and upon considering in connection therewith the attached drawings to which they relate.

Referring to the drawings in which a preferred embodiment of the invention is illustrated:

FIGURE 1 is a schematic view of a preferred embodiment of my invention.

FIGURE 2 is a view partly in side elevation and partly in cross-section.

FIGURE 3 is a view taken on line 3—3 of FIGURE 2 looking in direction of the arrows.

FIGURE 4 is a cross-sectional view taken on line 4—4 of FIGURE 5, looking in direction of the arrows.

FIGURE 5 is a top view of the auxiliary air intake valve.

FIGURE 6 is an isometric view of a multi-legged spider.

FIGURE 7 is a schematic view showing the pipe connection between the crank-case of the engine and fresh air inlet end of the filtered air transmission pipe which the crank-case gases are adapted to enter.

In the accompanying drawings, wherein for the purpose of illustration, only, there is shown a preferred embodiment of my present invention, wherein the reference character 10 designates an automobile chassis, which supports, at its forward end, an internal combustion engine having the usual crank-case 12 adapted to contain lubricating oil to a predetermined level so that the same will provide the usual gaseous waste fuel chamber 13 above the surface of the lubricating oil in the crank-case.

The reference character 14 designates the usual exhaust muffler. Its forward end is connected to the usual exhaust manifold 15 by means of the pipe 16. The usual tail exhaust pipe is designated 17, as clearly shown in FIGURE 1, of the drawings; but as substantially 100 percent of the inflammable fuel in the cylinders of the engine is ignited, in the usual manner, to produce horse-power, very little, if any noticeable gaseous fumes, are exhausted into the atmosphere through the muffler tail-pipe 17. Little or no smog conditions should be made possible by the use of my invention on any type of motor vehicle using an internal combustion engine for power.

The reference character 18 designates a gasoline-tank such as I use. It will be apparent that the usual gasoline-tank as now used in motor vehicles, must be modified on the interior thereof, so an entirely new gasoline-tank of my special design should replace the one now usually found on a motor vehicle. It is cheaper than making the usual gasoline-tank over to accommodate my invention. However, the gasoline-tank of my design will be supported at the rear end of the chassis, as is the present design of gasoline-tank. The gasoline tank is provided with the usual pipe 19 used for pouring gasoline 20 therethrough and into the gasoline tank 18. The gasoline tank may be provided with a suitable gasoline level gage 21 suitably attached to one end of the gasoline tank to visibly show how much gasoline is in the gasoline tank. The usual type of gasoline gage now used on the dash of the motor vehicle may be the only gage needed, but an auxiliary gasoline gage attached to the gasoline tank may be found desirable, especially, in case of an emergency.

The reference character 22 designates a suitable fresh air transmission pipe or conduit, the air inlet end of which is positioned adjacent the usual internal combustion engine 11 of a motor vehicle. The air transmission pipe 22 is provided with an air filter 23 having an air filtering material 24 contained therein through which air is filtered before passing into the air transmission pipe 22. The pipe 22 leads to and is suitably attached to the top wall of the gasoline tank 18, as clearly shown in FIGURE 2 of the drawings.

A suitable cylindrical tube 25 is suitably attached to the top wall of the gasoline tank 18 and extends downwardly through an opening 26 in the top wall of the gasoline tank to the bottom wall thereof. The tube 25 is in axial alignment with the outlet end of the air transmission pipe 22, as clearly apparent in FIGURE 2 of the drawings. The lower end of the tube 25 is disposed between the bottom of the gasoline tank 20 and a suitable baffle-plate 27 having a series of suitable perforated openings or passages 28 therein through which the gasoline 20 in the shallow chamber 29 may pass upwardly through the openings 28 to an upper larger chamber 30 formed by the baffle-plate 27 which is suitably attached at its edges to the side walls of the gasoline tank 18.

It will be noted that the gaseous fuel inlet tube 25 has its lower end portion downwardly directed through an opening 31 in the baffle-plate 27 to the bottom of the gasoline tank 18. Suitably attached to the lower end of the fuel inlet tube 25, in opposed relation, are a pair of suitable laterally directed gaseous fuel outlet pipes 32. Each of the two gaseous fuel outlet pipes 32 have a series of suitable gaseous motor fuel outlet openings 33 through which the crankcase gases are mixed with filtered fresh air forming when combined with an efficient inflammable gaseous motor fuel mixture which passes out of the pipe openings 33 at the bottom of the gasoline tank into the body of gasoline 20 and which is adapted to trickle upwardly through the gasoline to and above the surface thereof, and into gaseous fuel supply space or chamber 34 formed above the level of the gasoline 20 within the gasoline tank 18.

A suitable fuel inlet and trapping valve designated 35, shown in a schematic view, in FIGURE 2 of the drawings, forms an actual part of the gaseous fuel inlet tube or conduit 25. The valve 35 serves to relieve any unduly back pressure in the direction of the gaseous fuel chamber 34. It may be preferable to locate the valve 35 adjacent to the upper face of the baffle-plate, as clearly shown in FIGURE 2 of the drawings. The fuel inlet and trapping valve may be a check valve adapted to seal off the gaseous fuel supply chamber 34 in the gasoline tank 18 especially when the motor vehicle engine is not running.

The reference character 36 designates a suitable gaseous fuel outlet pipe or conduit which has its rear fuel intake end suitably attached to and extending upwardly and forwardly away from the gasoline tank. The pipe 36 is suitably attached at its upper or forward end to the intake manifold 37 of the engine to conduit the inflammable gaseous fuel 38 from the gaseous fuel chamber 34 to be introduced into the respective cylinders of the internal combustion engine 11 to be compressed by the engine pistons therein in their upstrokes to be ignited in the usual manner to provide horse-power to move the motor vehicle, and without the use of the usual gasoline pump and the usual conventional carburetor, neither of which do I use in my invention.

The reference character 39 designates a suitable valve, such as a butter-fly valve, shown in a schematic view in FIGURE 1 of the drawings, and it forms an actual part of the fuel outlet pipe 36, and it is located a short distance rearwardly from the intake manifold 37 of the engine 11, as clearly shown in FIGURE 1 of the drawings. The valve 39 permits a required amount fresh air to be admitted into the gaseous fuel 38 in the gaseous fuel outlet pipe 36 when needed in cold weather to start the cold engine, as apparent hereinafter. The valve 39 is preferably controlled from the dash of the motor vehicle.

The reference character 40 designates a suitable combination relief and check valve, shown in a schematic view, in FIGURE 1 of the drawings, and it also forms an actual part of the gaseous fuel outlet pipe 36. The valve 40 serves to relieve any undue high gaseous fuel pressure that may build up in the gaseous fuel outlet pipe or conduit 36. This valve 40 is preferably automatically operated by suction from the engine, but it may be operated from the dash of the motor vehicle, if so desired.

In order to heat the crankcase gases with a mixture of filtered fresh air, the said gaseous fuel 38 is conducted from the crankcase fuel chamber 13 above the oil therein through a suitable pipe 41 connected at one end to a wall of the crankcase 13 and at its opposite end is suitably connected with the forward end of the filtered air transmission pipe 22 which leads to the gasoline tank 18, as is apparent from FIGURE 1 of the drawings.

It will be noted that I contact like portions of both gaseous fuel conducting pipes 22 and 36 with the outer wall of the exhaust muffler 14, as clearly shown in FIGURE 1 of the drawings, and they are held tightly in contact with the hot outer wall of the exhaust gas muffler 14 by means, such as pair suitable metal straps 42. The outside of the gas exhaust muffler and the portions of the pipes 22 and 36, substantially the length of the muffler 14, contact the outer hot wall of the muffler, and the muffler and the pipes 22 and 36 are covered with suitable insulating material 57, such as asbestos or its equivalent. Thus the gaseous fuel in both pipes 22 and 36 is easily heated.

In order to make starting of the engine 11 easier in very cold weather, it may be necessary to prime the engine, therefore I have provided a small gasoline tank designated 43, as clearly shown in FIGURE 1 of the drawings, which is adapted to contain an amount of gasoline for emergency use only. A suitable pipe 44 is attached at one end to a wall of the small gasoline tank 43, and the opposite end of the pipe 44 is suitably attached to the forward end of the gaseous fuel outlet pipe 36 in advance of the butter-fly valve 45 connected into the pipe 44 so that the valve 45 may be turned on and off when found necessary.

The reference character 46 designates, generally a spring controlled auxiliary valve used in constructing my invention. The valve consists of a cylindrical air inlet tube 47 which is normally open at both ends. A suitable spider 48 having a plurality of radiating legs 49 is adapted to be suitably secured to the upper end of the valve body 47 to provide a plurality of air inlet passages 50 to permit fresh air into the inside of valve body 47, as will be apparent from FIGURE 5 of the drawings. The center of the spider is provided with a bearing opening 51 through which a piston-stem 52 is slidably mounted. A suitable piston 53 is mounted within the valve body 47, and the lower end of the piston-stem 52 passes downwardly through the spider center opening 51 and is slidably connected to the center of the head of the piston 53. A suitable nut 54 is carried by the upper end of the valve stem 52, and a coiled spring 55 encircles the piston stem 52 between the piston and the nut carried thereby. The upper wall for approximately two inches down from the top edge of the valve body 47 is provided with a series of perforated air outlets 56 to let fresh air into the gaseous fuel chamber 34 in the gasoline tank 18. The valve body 47 is not perforated near its upper edge thereof so that the coiled spring 55 can work on low suction from the engine to shut off at low engine speed, so that when the engine is idling and the motor vehicle is standing still without the engine running.

It is believed that the motor vehicle equipped with my invention not only has the advantage of using less gasoline and producing smoother power, and performs with noticeable economy in gasoline and oil, as oil does not become thin and diluted as it does now, and all useable inflammable gaseous fuel is ignited and completely burnt to produce horse-power, and the invention is believed to easily accomplish the above and other features with a substantially 100 percent reduction in noxiousness and toxicity of the exhaust gases are now discharged into the atmosphere by automobiles, trucks, tractors and other motor driven vehicles. The now wasted crank-case gases are considered by me, and by others, as of the same chemical composition, or at least the equivalent thereof now fed from the conventional types of carburetors now in use, which carburetors I do not use in my invention.

My invention herein described, provides a chemically balanced gaseous motor fuel that is not now produced by the use of carburetors. I use substantially all crank-case gases in my process that are now actually wasted with the use of a carburetor, as the wasted gases I utilize I mix with the required amount of fresh filtered air thoroughly mixed and even soaked with raw gasoline when passing upwardly therethrough in the gasoline tank 18, on its way to the gaseous fuel supply chamber 34, and from there conducted into the intake manifold 37, as a perfect chemically balanced motor fuel to be ignited in the engine cylinders to produce horse-power, thus substantially no harmful gasoline gases from the engine are discharged into the atmosphere from the exhaust muffler 14 into the air, when using my invention.

The main gas vapor and air intake valve which is a check valve in tube 25, the auxiliary air intake valve, the butter-fly valve, and the relief and check valve need no adjustments, once they are set, and they perform their duties by suction from the engine cylinders in their upstrokes in the engine cylinders. My improved fuel evaporator and economizer requires no replacement parts, as do carburetors. All that is needed to do is to fill the gasoline tank, and put oil in the crank-case, when needed.

My present invention not only has the advantage of producing more smooth power, cutting down on air pollution, and it performs with most noticeable economy in gasoline and oil, as the oil does not become thin and diluted, and the invention accomplishes the above features with substantially great reduction in noxiousness and toxicity of the exhaust gas fumes discharged into the atmosphere. I use these wasted gases from the crank-case and mix them with raw gasoline, actually soak with gasoline in the gasoline tank, and mix plenty of fresh filtered air and efficiently conduct them to the engine cylinders as perfect inflammable gaseous fuel to be ignited in the engine cylinders to develop substantially cheap and smooth engine horse power.

It is to be understood that the form of my present invention herein shown and described is to be taken as a preferred example and arrangement of the several parts of the invention may be resorted to, and that various changes in the shape and size of the several parts may also be resorted to, without departing from the spirit of my invention, or the appended claims.

What I claim is:

1. A fuel-supply system for an internal-combustion engine having a fuel intake and a crank case wherein waste gas is normally accumulated, and further including an exhaust muffler, said fuel-supply system comprising:
   a fuel tank defining a closed chamber for fuel storage;
   a perforated baffle structure affixed in the lower interior of said fuel tank;
   first means connecting said crank case in which waste gas is accumulated to said fuel tank at a location in said fuel tank that is below said baffle structure;
   second means connecting said fuel tank, at an upper portion thereof, to said engine fuel intake;
   a demand air-intake valve means affixed in said fuel tank to supply air to said means connecting said fuel tank to said engine fuel intake for regulating air flow therethrough into said engine fuel intake in accordance with demand, and
   a heat exchanger means, for coupling said muffler to said first means and said second means, whereby gas in said first means and said second means is heated substantially by heat from said exhaust muffler.

2. A fuel-supply system according to claim 1 wherein said demand air-intake valve means includes a variable-orifice flow control means; and further includes means for establishing the state thereof between an open state and a closed state in accordance with the demand to supply air to said means connecting said fuel tank to said engine fuel intake.

3. A fuel-supply system according to claim 2 wherein said perforated baffle structure extends to substantially distribute waste gas throughout the entire fuel tank.

4. A fuel-supply system according to claim 2 further including an auxiliary fuel source for providing fuel to said engine during starting intervals.

5. A fuel-supply system according to claim 2 further including check value means coupled in said means connecting said case to said fuel tank whereby to relieve excessive pressures in said fuel tank.

References Cited
UNITED STATES PATENTS

| | | | |
|---|---|---|---|
| 1,138,581 | 5/1915 | Shumaker. | |
| 1,277,997 | 9/1918 | Newlun | 123—119 |
| 1,380,173 | 5/1921 | Abel | 123—119 |
| 2,430,852 | 11/1947 | Allen | 123—119 X |
| 1,099,504 | 6/1914 | Kutscher. | |
| 1,241,155 | 9/1917 | Sevigny. | |

JULIUS E. WEST, *Primary Examiner.*